United States Patent [19]
Young et al.

[11] Patent Number: 5,699,190
[45] Date of Patent: Dec. 16, 1997

[54] LENTICULAR MEDIA HAVING SPATIALLY ENCODED PORTIONS

[75] Inventors: Richard Dean Young, Fairport; Richard John Tuschong, Rochester, both of N.Y.

[73] Assignee: Eastman Kodak Company, Rochester, N.Y.

[21] Appl. No.: 567,790

[22] Filed: Dec. 5, 1995

[51] Int. Cl.$^6$ .................................................. G02B 27/10
[52] U.S. Cl. ........................ 359/619; 359/620; 359/628
[58] Field of Search ............................ 359/619, 620, 359/628, 455, 458, 463; 345/32, 139

[56] References Cited

U.S. PATENT DOCUMENTS

| | | | |
|---|---|---|---|
| 2,268,351 | 12/1941 | Tanaka | 359/458 |
| 2,393,308 | 1/1946 | Brown | 88/1 |
| 3,122,853 | 3/1964 | Koonz et al. | 43/42.24 |
| 3,330,614 | 7/1967 | Cullis | 350/167 |
| 3,565,733 | 2/1971 | Leach | 359/455 |
| 3,582,984 | 6/1971 | Kanagawa-ken | 178/5.4 |
| 3,884,554 | 5/1975 | Lemelson | 350/164 |
| 3,940,788 | 2/1976 | Abe et al. | 359/569 |
| 4,417,784 | 11/1983 | Knop | 359/619 |
| 4,420,527 | 12/1983 | Conley | 428/172 |
| 4,757,350 | 7/1988 | Street | 355/22 |
| 5,035,486 | 7/1991 | Inokuchi | 350/167 |
| 5,071,224 | 12/1991 | Yokoo | 359/456 |
| 5,298,366 | 3/1994 | Iwasaki et al. | 430/321 |
| 5,359,454 | 10/1994 | Steenblik | 359/463 |
| 5,392,140 | 2/1995 | Ezra | 359/41 |
| 5,424,553 | 6/1995 | Morton | 250/548 |
| 5,554,432 | 9/1996 | Sander | 428/157 |

FOREIGN PATENT DOCUMENTS

| | | | |
|---|---|---|---|
| 7-322301 | 3/1981 | Japan. | |
| 59-204833 | 11/1984 | Japan | 359/455 |

*Primary Examiner*—David C. Nelms
*Assistant Examiner*—Ricky Mack
*Attorney, Agent, or Firm*—Clyde E. Bailey, Sr.

[57] ABSTRACT

A lenticular media (10) has an encoded portion (12) adjoining a main portion (14). The encoded portion (12) is located to provide alignment and registration for precisely determining the location of lenticules (16) in the main portion (14).

26 Claims, 3 Drawing Sheets

LENTICULAR MEDIA HAVING SPATIALLY ENCODED PORTIONS

FIELD OF THE INVENTION

The present invention relates generally to lenticular material or media. More particularly, the invention relates to lenticular material or media having encoded portions for precisely locating lenticules in the media.

BACKGROUND OF THE INVENTION

Sheets of optically transparent material with a periodic lenticular pattern formed on its surface are used for producing 3-dimensional photographic depth visualization effects and minor animation effects in depth imaging products. These imaging effects are best achieved under the proper viewing conditions of a lenticular sheet that is precisely aligned and assembled to a specially designed companion film sheet. Therefore, for lenticular sheets composed of, for instance, parallel conic section lenticules of defined spatial periodicity formed on the surface of an optically transparent polymer sheet, it is important to accurately determine the location of the sheet's lenticular features relative to external datums such as may be found on a companion film sheet for optimizing imaging effects. Moreover, it is also important to precisely determine the spatial position of the lenticules' centerlines and a lenticule's skewness over a length of the sheet, especially if these sheets with optical refractive properties are an integral component of depth imaging products, where the centerline of a particular lenticule is desired to be precisely aligned to features on a companion film sheet. The derived lenticule position measurements are useful for automatically providing lenticular sheet location prior to assembly or interfacing processes.

The centerline position of any lenticule can be calculated within a single viewing area of the sheet. However, to precisely determine the extent of subtle skewness relative to global datums over a significant length of a sheet, it is preferable to measure the lenticule sheet in at least two places separated by a substantial distance to improve the measurement location accuracy for the skewness factor. For the precise alignment of normal lenticular sheet product, defined as having a fully periodic array of lenticules spanning the sheet, it is not reasonable to reliably identify in two separate viewing areas of the sheet, the position of a particular lenticule amongst other periodic lenticules without extensive fixturing, or sheet edge to lenticule registration, or dynamic fine follower techniques.

Current techniques used for assembling depth imaging products relate to manually aligning within a small viewing area, the lenticules within a sheet to image datum features on the companion film sheet. The approaches make use of the imaging effects and interaction that can be visualized when a lenticular sheet is in direct contact to the film sheet registration features. This approach can be disadvantaged due to the time consuming nature of manual alignment, and can be subject to human error with regard to placement when very precise alignment is demanded. Another shortcoming of this technique is that it requires the contact interfacing of the lenticular sheet to the film sheet during the alignment process. Furthermore, for a normal lenticular sheet, realignment of the sheet to correct for position errors such as skewness over a significant distance interval along the lenticules can be extremely difficult to discern using the manual approach.

There have been numerous unsuccessful prior art attempts to address one or more of the above problems including U.S. Pat. No. 3,884,554 which teaches lenticular sheets designed to generate a diffraction pattern, with areas lacking lenticules forming indicia regions in the observed diffraction pattern. Also, U.S. Pat. No. 3,940,788 teaches regular spaced intervals between lenticules to provide a means of low pass filtering in conjunction with a phase grating for eliminating color shading and distortion in color television systems. Further, U.S. Pat. No. 5,298,366, describes a means of forming a microlens array and lenticular material incorporating a photoresist methodology. Furthermore, U.S. Pat. No. 4,420,527 discloses a process for manufacturing composite periodic lenticular sheets making use of drum casting of radiation cured materials against a molding face onto a base web.

None of the aforementioned prior art solves the problem of automatically locating in a precise manner the position of the lenticule features within a lenticular media, and correcting the location of the media based on the measurement information derived therefrom.

It is, therefore, an object of this invention to provide lenticular media having intrinsic features for automatically locating lenticules in the media.

It is a feature of the invention to provide an encoded portion adjoining an arrangement of lenticules located on the lenticular media.

It is an advantage of the present invention that when it is desired to locate the position of lenticules in the lenticular media, the position of the encoded lenticular portion in alignment and registration therewith can be sensed and thereby provides an accurate means of determining the desired lenticule location.

Another advantage of the present invention is that the generation of encoded portion on pattern forming surfaces requires only modifcations of existing cutting tool engagement process and does not require secondary tooling nor secondary tooling passes.

SUMMARY OF THE INVENTION

To accomplish these and other objects of the invention, there is provided, in one aspect of the invention, a lenticular material or media that has at least one encoded portion adjoining a main portion. The encoded portion is configured to provide alignment and registration for precisely determining the location of the main portion.

In another aspect of the invention, an article of manufacture has an encoded portion and main portion as configured and described above.

Yet another aspect of the invention is a method of forming a lenticular media pattern having a main portion and encoded portions thereon. The encoded portion is provided for alignment and registration of the main portion. The method includes providing a first surface for receiving a negative lenticular media pattern. Further, a second surface is provided for imparting the negative lenticular media pattern in the first surface. Moreover, a third surface is provided for receiving the negative lenticular media pattern from the first surface. The second surface is engageably contacted in predetermined regions of the first surface so as to form the main portion and encoded portion of the negative lenticular media pattern on the first surface. In this embodiment, the second surface has geometry for imparting the negative lenticular media pattern in the first surface. Finally, the step of impressing the negative lenticular media pattern of the first surface into contact with the third surface is provided thereby forming a lenticular media pattern in the third surface. The formation of this pattern in the third surface defines lenticular media.

BRIEF DESCRIPTION OF THE DRAWINGS

The foregoing as well as other objects, features and advantages of this invention will become more apparent from the appended Figures, wherein like reference numerals denote like elements, and wherein.

DESCRIPTION OF THE PREFERRED EMBODIMENTS

Figure 1:
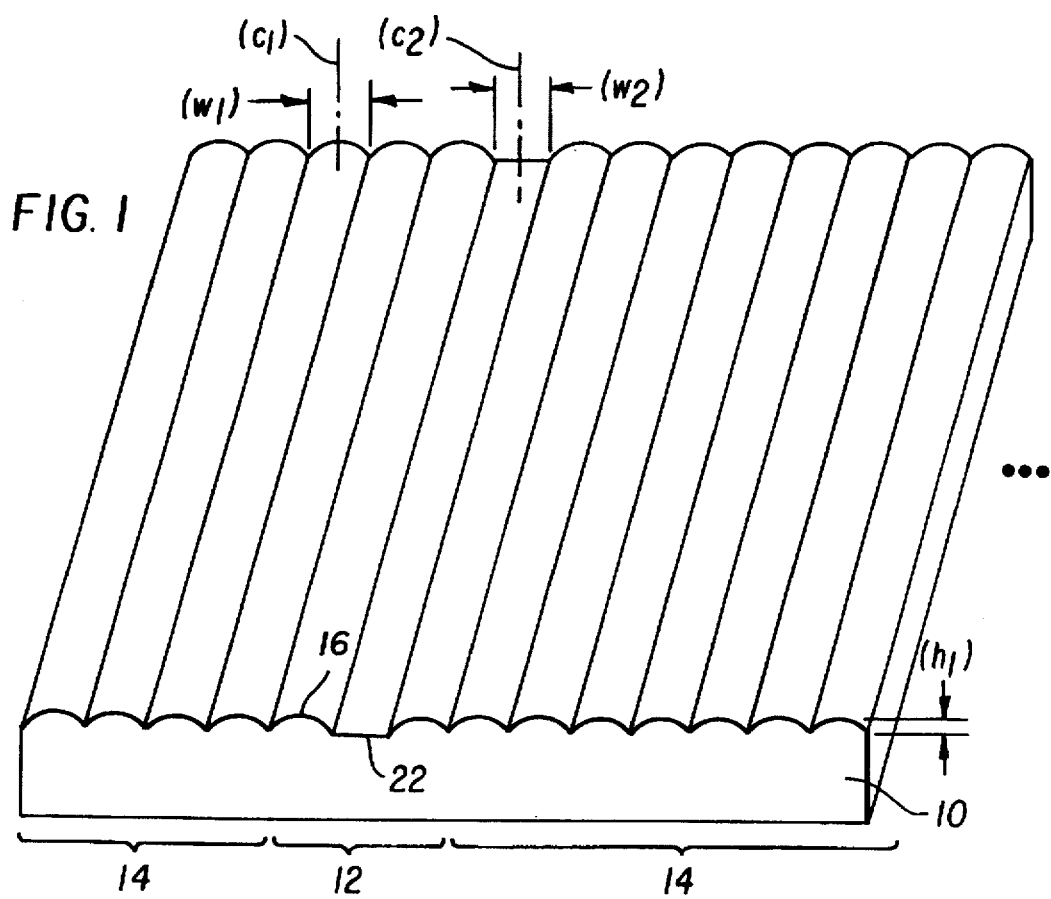
FIG. 1 is a partial section of the lenticular media with an encoded portion.
Figure 2:
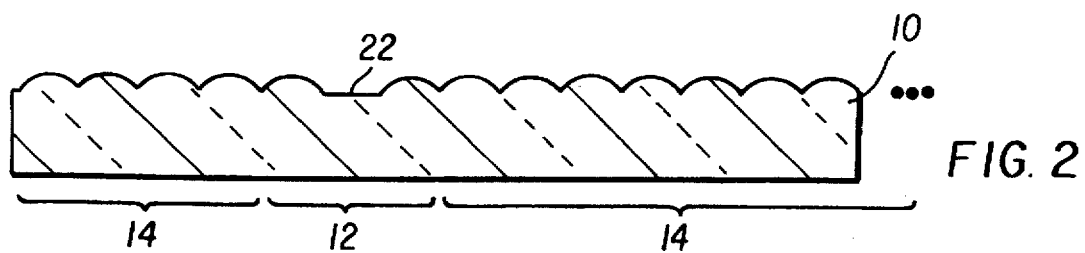
FIGS. 2–3 are partial cross-sectional views of lenticular media with various encoded portions.
Figure 3:
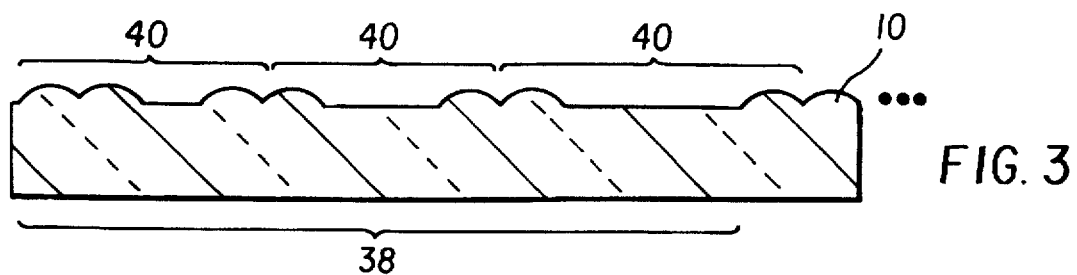

Turning now to the drawings, and in particular to FIGS. 1–3, the article of manufacture, alternately referred to as lenticular material or media, 10, in accordance with the principles of the invention is illustrated. Broadly defined, the article of manufacture, or lenticular media, 10 comprises an encoded portion 12 adjoined to a main portion 14. Lenticular media 10 may be a web (shown in FIG.), such as photographic film material and the like. The encoded portion or absent lenticule, 12 is positioned relative to the main portion 14 so as to provide alignment and registration for precisely determining the location of the main portion 14. One such device for measuring the location of the main portion in lenticular media is an optical sensing device described in U.S. patent application D72916, hereby incorporated herein by reference. The main portion 14 comprises a plurality of lenticules 16 formed therein. Lenticules 16 are preferably substantially parallel conically shaped sections, although other geometric shapes, such as triangular, spherical, etc, are contemplated within the spirit of the invention.

For depth imaging type systems, the alignment precision in the lateral offset and skew between the lenticular media 10 and companion film sheet (not shown) are most preferred for desired special imaging effects of 3-dimensional depth photography and minor animation of images. Therefore, it is important to precisely determine the initial position of the parallel conic section lenticules 16 most preferably used in these systems, to enable precision alignment to the film sheet image in subsequent assembly processes (not shown). In a preferred embodiment of the invention, a distinguishable encoded portion 12 is introduced into the lenticular media 10 that will intrinsically permit absolute position sensing measurements along the entire length of lenticular media 10, as seen in FIG. 1. As shown in FIGS. 2 and 3, the encoded portion 12 may include a pattern of variant conic sectioned lenticules 16 within a preferred normal periodic array of lenticules spanning the lenticular media 10. Encoded portion 11 comprises preferably a planar region 22 characterized by width ($w_2$) and a centerline ($c_2$) defined as the midpoint of width ($w_2$). The cylindrical conic section lenticules 16 are characterized by height (h), width ($w_1$) and a centerline ($c_1$) which is defined as the midpoint of width ($w_1$). We have found that best results are obtained when $w_2$ is substantially equal to $w_1$, although either one may be greater than or less than the other.

Figure 4:
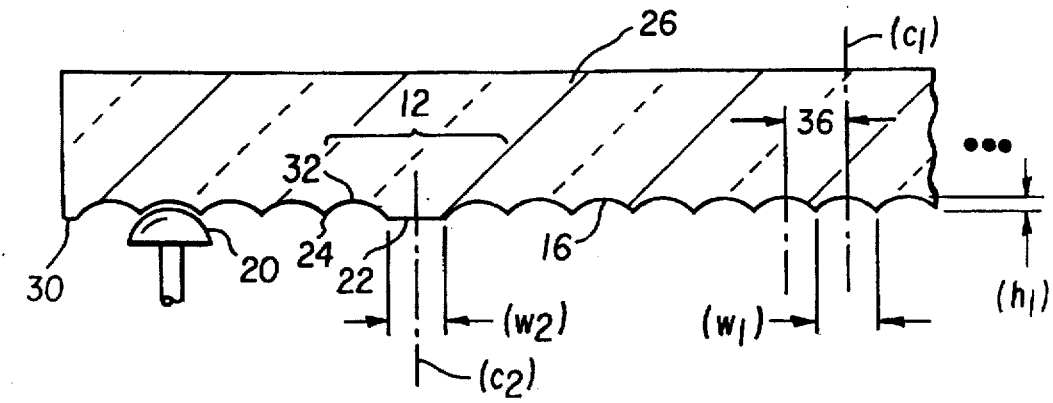
FIGS. 4–5 are partial cross-sectional views of a chill roll with encoded portion.
Figure 5:
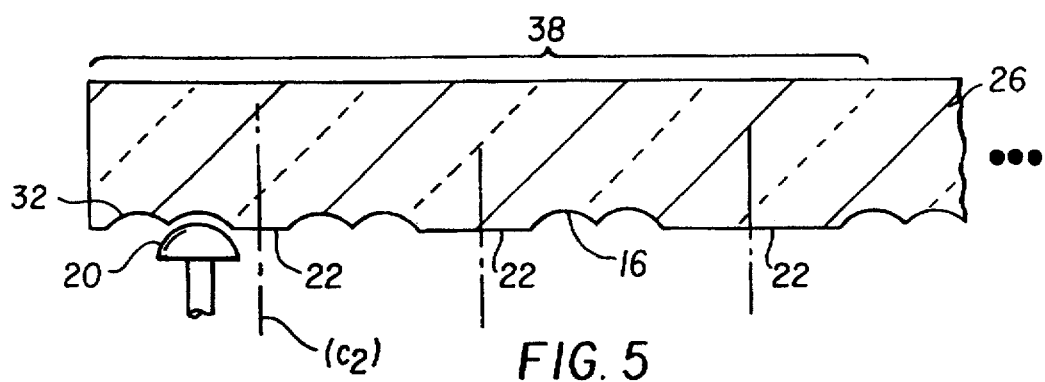

In order to most effectively introduce the encoded portion or absent lenticule, 12 into the lenticular media 10, we have found that it is preferable to first produce the encoded portion 12 in a first surface, also sometimes referred to as chill roll or mold face, 26 (FIGS. 4 & 5). This has advantages over modifying already formed fully periodic lenticular media 10 in the form of, for example, plastic sheets via a media post-processing means, such as, mechanical machining or laser processing the lenticules on the sheets themselves. Given this, we think it is preferable to modify the surface of the mold face 26 or lenticular forming mechanisms, as described below. The lenticular media 10 can be formed by a number of manufacturing processes including injection molding and compression molding. However, we have found that the most preferred way to form lenticular media 10 is by an extrusion process wherein a plastic material is impressed against the first surface, such as a chill roll, 26 as described below.

As an example, for the extrusion process incorporating a rotating chill roll serving as the mold face, one can form a negative lenticule profile 28 on the chill roll 26 as depicted in FIG. 4, by machining into the nominal surface of the chill roll 26 the negative relief of a lenticule 16 using a second surface, or cutting tool, 20 of a geometry matching the lenticule shape to form a negative lenticule media pattern 29 on chill roll 26. After precisely cross-indexing either the chill roll 26 or cutting tool 20 at a lenticule pitch interval 36, this profile cutting machining cycle is then normally repeated until the negative relief lenticule feature pattern spans the entire active area of the chill roll 26.

To introduce the encoded portion 12 onto the surface 30 of chill roll 26, the previous second surface, or cutting tool, 20 engagement process would be the same except that the existing tool 20 is not in contact with the surface 30 of chill roll 26 during the interval where an encoded portion 12 is desired. In FIG. 4, the plunge depth of cutting tool 20 is such that the height (h) between the peak 32 and the cusp point 24, formed by the intersection profile minima of adjacent conic section lenticules 16, correspond with the original nominal width ($w_2$) of the planar region 22 of the encoded portion 12. Thus, we have found that it is preferred that width ($w_2$) of the encoded portion 12 is equal to the width ($w_1$) of the nominal lenticule 16 of the main portion 14 of the lenticular media 10. The precision cross-indexing means for advancing to the next pitch is still an inherent part of this engagement process, so that the centerline ($c_2$) of the encoded portion 12 can be precisely maintained as an integral multiple of lenticule pitch 36 (FIG. 4) in relation to all other periodic lenticule centerlines ($c_1$) or cusp point of lenticule. To generate a series of encoded portions 12 which are a function of spatial location defined as an array of encoded lenticular regions 38 as shown in FIG. 5, the second surface or tool 20 would not be permitted to contact the surface 30 of chill roll 25 in these selected regions. As previously described, the spatial relationship of the encoded portion 12 to centerline pitch 36 of lenticules 16 are precisely maintained due to the cross-indexing drive positioning accuracy being the same whether the cutting tool 20 is engaged or not in contact with the first surface or chill roll 26 for a given pitch.

Figure 6:
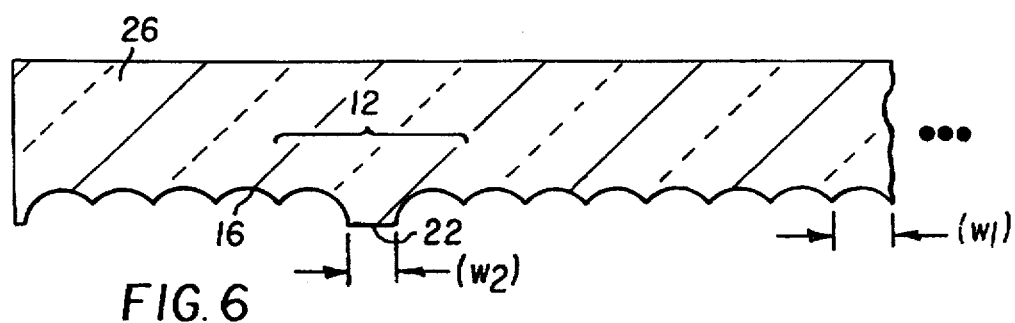
FIGS. 6–9 are partial cross-sectional views of a chill roll with encoded portion having non-standard width ($w_2$)
Figure 7:
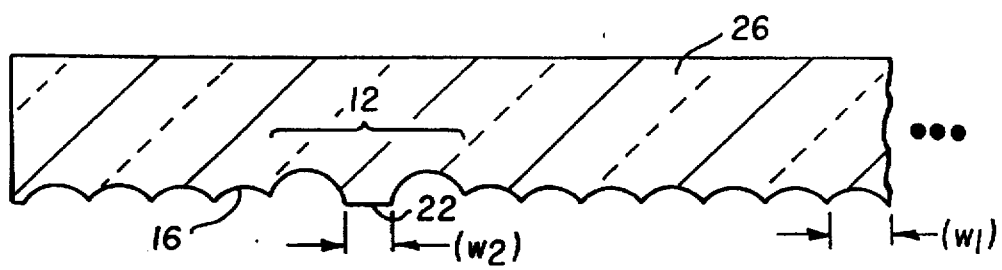
Figure 8:
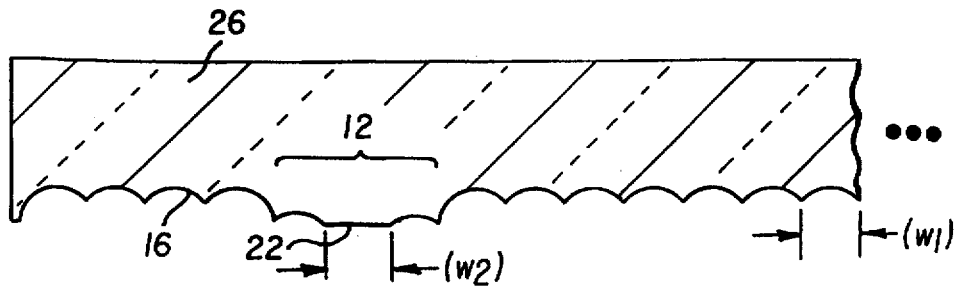
Figure 9:
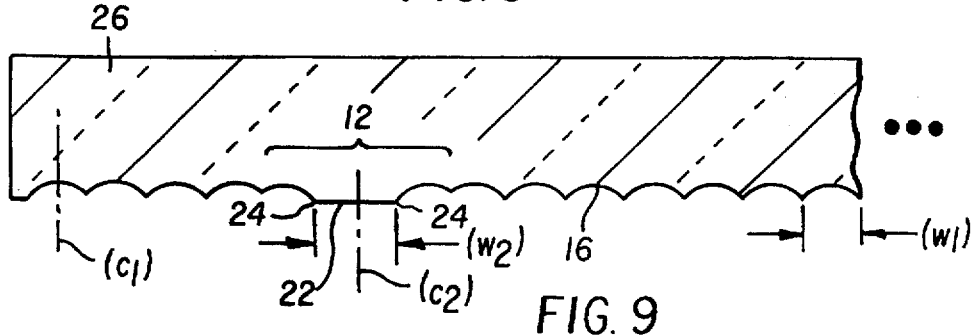

Creating an encoded portion 12 or a region 38 of encoded portions 12 of non-standard planar region widths ($w_2$) that is still on centerline pitch with adjacent lenticules 16 on the main portion 14 can be achieved to further qualify this encoded portion 12 or region 38 as a distinct alignment feature. The altering of width ($w_2$) of planar region 22 of encoded portion 12 can be accomplished by further modifying the tool 20 engagement process as described below. As an example, to obtain the cross-section profile illustrated in FIG. 6 with planar region 22 of encoded portion 12 less than the standard width ($w_1$) of a lenticule 16, the plunge depth of tool 20 for all nominal lenticules 16 is deeper than previously described. Another means is to increase the plunge depth of tool 20 to the two adjacent lenticules 16 bounding the planar region 22 of encoded portion 12, resulting in a cross-section profile in the chill roll 26, as illustrated in FIG. 7 where width ($w_2$) of planar region 22 is now narrower than standard width ($w_2$) by at least 2% of standard width ($w_2$). Similarly, by decreasing the depth of the tool plunge to adjacent bounding lenticules 16 to the planar region 22 of encoded portion 12, results in a cross-section profile in the chill roll 26, as illustrated in FIG. 8 where the width ($w_2$) of the planar region 22 is now wider than standard width ($w_2$). Another means of increasing the width ($w_2$) of the planar region 22 of encoded portion 12 is to offset the cutting index centerline position of the two adjacent lenticules 16 to the planar region 22 resulting in the cross-section profile in the chill roll 26, as illustrated in FIG. 9. These described methods provide the shifting of the cusp points 24 associated with the encoded portion 12 off pitch in order to further qualify the distinct alignment feature. The associated centerline ($c_2$) from the pair-wise crisp points 24 about the planar region 22 feature is still on-pitch with the centerlines ($c_1$) of the plurality of periodic lenticules 16.

In a preferred embodiment, the lenticular media 10 has at least one encoded portion 12 having a planar region 22 (as previously described) of predetermined widths ($w_2$) and centerline ($c_2$) that is adjoined to at least one lenticule 16 having a predetermined height (h), width ($w_1$) and centerline ($c_1$), the adjoined encoded portion 12 and lenticule 16 forming an encoded lenticular region 40. Moreover, in this embodiment of lenticular media 10, a plurality of encoded lenticular regions 40 are adjoined to form an array of encoded lenticular regions 38. Each encoded lenticular region 40 comprises an encoded portion 12 having a planar region 22 and at least one lenticule 16. As indicated above, the planar region 22 and the lenticule 16 are characterized by predetermined width ($w_2$) and centerline ($c_2$) and height (h), width ($w_1$) and centerline ($c_1$), respectively.

Other machining means requiring a secondary tool or a secondary pass of the first tool to generate a special distinct alignment feature on the chill roll 26 are not preferred due to the preference for extremely accurate position registration of centerline pitch of lenticule 16, especially in regard to the distinct alignment feature. These methodologies could introduce additional position errors of the encoded portion 12 due to the seating of the secondary tool in relation to the first tool as well as positioning errors attributed to indexing repeatability of any secondary pass in relation to the initial pass of the tool. Another means of generating an encoded portion 12 is to modify the existing negative relief pattern of periodic lenticules 16 on the chill roll 26 by machining down certain cusp points 24 on the chill roll 26 until a flat is formed between the peaks of adjacent lenticules. This is not as advantaged because of the secondary machining process to the chill roll and more importantly the resultant encoded portion 12 now corresponds with a flat zone spanning two lenticule pitch widths at the lenticules' peak elevation rather than a singular planar region at chill roll surface level 30. This can be significant when an efficient spatial encoding scheme including encoded portions 12 as single lenticule widths ($w_1$) in the pattern is employed.

Figure 10:
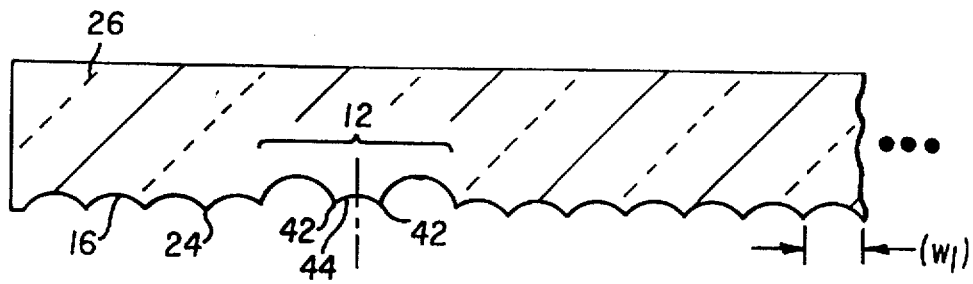
FIGS. 10–12 are partial cross-sectional views of a chill roll with variant conic section geometries.
Figure 11:
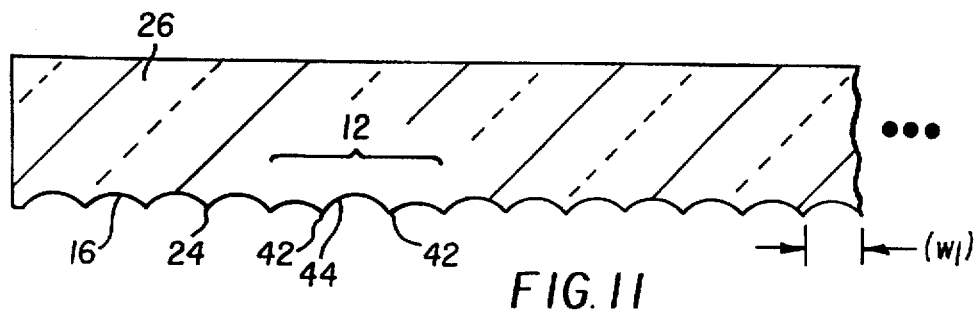
Figure 12:
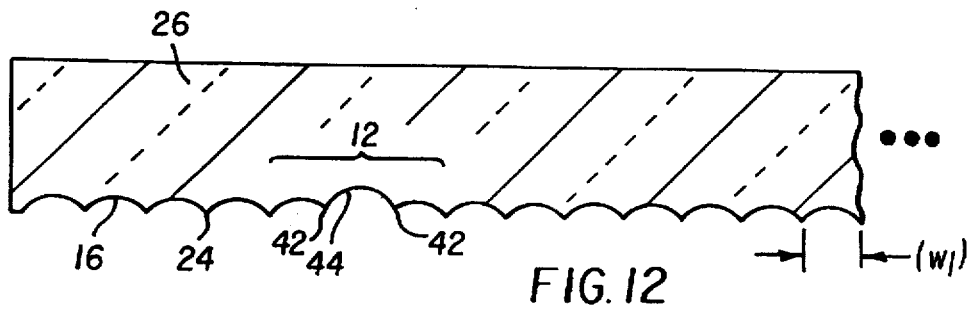

Alternatively to the preferred alignment feature of the encoded portion 12, one could spatially encode an alignment feature consisting of variant conic sections using the existing cutting tool 20 designed for placing nominal geometry lenticules 16 into surface 30 of chill roll 26. Simplified representations are shown in FIGS. 10–12 for introducing into surface 30 of chill roll 26, various variant conic section alignment features with intrinsic modified cusp point 42 location shifts to distinguish them from cusp points 24 of normal periodic lenticules 16. In FIG. 10, the plunge depth of tool 20 is increased for the two lenticules 16 bounding the alignment feature 44 of encoded portion 12. This results in modified cusp points 42 associated with the encoded portion 12 which are symmetrically shifted toward the centerline ($c_2$) of encoded portion 12, and these modified cusp points 42 are no longer on pitch with all other cusp points 24 associated with the plurality of periodic nominal depth lenticules. Similarly, by decreasing the plunge depth of tool 20 for the two lenticules 16 bounding the alignment feature 44 of encoded portion 12, as shown in FIG. 11, results in modified cusp points 42 shafted outward from centerline ($c_2$) of encoded portion 12. FIG. 12 depicts conic section variants with the encoded portion 12 formed by a deeper tool plunge of alignment feature 44 of encoded portion 12, creating modified cusp points 42 of the encoded portion 12 which are shifted symmetrically away from the centerline ($c_2$) of the encoded portion 12. For the variant conic section examples shown in FIGS. 10–12, the pair-wise modified cusp points 42 defined as those symmetric about the encoded portion 12 can be used to calculate the centerline ($c_2$) of the encoded portion 12 by a spatial mid-point calculation. Other spatial encoding schemes could also be envisioned involving complex patterns of these variant conic sections placed as a function of lateral location within lenticular media 10. The cutting process for chill roll 26 would involve varying the cutting depth at selected lenticule centerline ($c_1$) positions to obtain distinct conic sections as a function of location. The centerline pitch of each variant conic section feature is precisely maintained due to the cross-indexing drive precision being maintained at various plunge depths of the cutting tool 20.

Once the chill roll, or mold face, 26 has the registration feature such as encoded portion 12, the manufacturing process for the lenticular media 10 with special encoded portion 12 can proceed by one of the lenticular product forming methods enumerated previously. The transference of the main portion 14 with the encoded portion 12 onto a third surface, preferably a transparent surface such as a transparent plastic sheet or glass (not shown), produces lenticular media 10 with an alignment feature to facilitate subsequent precision placement and registration of lenticular sheets. Furthermore, the planar region 22 of encoded portion can be used for the guidance and registration of media finishing processes to lenticular media 10, such as slitting media to a predetermined size along encoded portion. For example, a slitter knife (not shown) in pressured contact with a planar region 22 of lenticular media 10 would be guided and slit down the channeled feature formed by planar region 22 and lenticules 16 adjoining planar region 22 of extruded lenticular media 10.

PARTS LIST

10 . . . article of manufacture or lenticular media
12 . . . encoded portion of lenticular media
14 . . . main portion of lenticular media
16 . . . lenticules of main portion
20 . . . second surface or cutting tool
22 . . . planar region
24 . . . cusp point
26 . . . chill roll (or mold face)
28 . . . negative lenticule profile
30 . . . surface of roll 32 ... peak
36 ... lenticule pitch interval
38 ... array of encoded lenticule regions
40 ... encoded lenticule region
42 ... modified cusp point
44 ... alignment feature While the invention has been described with a certain degree of particularity it is manifest that many changes may be made in the details of construction and the arrangements of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What we claim is:

1. A lenticular media comprising at least one encoded portion adjoining a main portion, wherein said encoded portion is positioned to provide alignment and registration for precisely determining the location of the main portion, said encoded portion comprising a plurality of planar regions, each of said planar regions being separated by at least one lenticule.

2. The lenticular media according to claim 1 wherein said media comprises sheet form.

3. The lenticular media according to claim 2 wherein said media is a transparent plastic.

4. The lenticular media according to claim 1 wherein said main portion comprises a plurality of lenticules.

5. The lenticular media according to claim 4 wherein each of said lenticules comprises a cylindrical conic section having a width ($w_1$), and said planar region has a width ($w_2$) substantially equal to the width ($w_1$).

6. The lenticular media according to claim 5 wherein said lenticules are arranged having a pitch defined by spacing between adjacent centerlines.

7. The lenticular media according to claim 6 wherein said lenticules have a periodicity defined by a constant pitch.

8. The lenticular media according to claim 4 wherein said lenticules are arranged in a parallel array.

9. The lenticular media of claim 1, wherein each of said plurality of planar regions has a centerline ($c_2$) and said at least one lenticule has a centerline ($c_1$) wherein said centerline ($c_2$) of one of said planar regions is located at a predetermined distance from centerline ($c_1$) of any one of said at least one lenticule in said main portion.

10. The lenticular media recited in claim 1 wherein at least one encoded portion having a planar region is adjoined to at least one lenticule forming an encoded lenticular region.

11. The lenticular media recited in claim 10 wherein a plurality of encoded lenticular regions are adjoined to form an array of encoded lenticular regions, and wherein each encoded lenticular region comprises an encoded portion having a planar region and at least one lenticule.

12. An article of manufacture comprising at least one encoded portion adjoining a main portion, wherein said encoded portion is positioned to provide alignment and registration for precisely determining the location of the main portion, and wherein said encoded portion comprises a plurality of planar regions, each said planar regions being separated by at least one lenticule.

13. The article of manufacture according to claim 12 wherein said media comprises sheet form.

14. The article of manufacture according to claim 13 wherein said media is a transparent plastic or glass.

15. The article of manufacture according to claim 12 wherein said main portion comprises a plurality of lenticules.

16. The article of manufacture according to claim 15 wherein each of said lenticules comprises a cylindrical conic section having a width ($w_1$), and said planar region has a width ($w_2$) substantially equal to the width ($w_1$).

17. The article of manufacture according to claim 16 wherein said lenticules have a periodicity defined by a constant pitch.

18. The article of manufacture according to claim 17 wherein said lenticules are arranged in a parallel array.

19. The article of manufacture recited in claim 15 wherein each one of said plurality of planar regions has a centerline ($c_2$) and each one of said plurality of lenticules has a centerline ($c_1$) and wherein the centerline ($c_2$) of one of said plurality of planar regions is located at a predetermined distance from the centerline ($c_1$) of any one of said lenticules in said main portion.

20. The article of manufacture recited in claim 19 wherein at least one encoded portion having a planar region is adjoined to at least one lenticule, and wherein said adjoining encoded portion and said lenticule forms an encoded lenticular region.

21. The article of manufacture recited in claim 20 wherein a plurality of encoded lenticular regions are adjoined to form an array of encoded lenticular regions, and wherein each encoded lenticular region comprises an encoded portion having a planar region and at least one lenticule.

22. A method of forming lenticular media having a main portion and an encoded portion therein, said encoded portion being provided for alignment and registration of said main portion, the method comprising the steps of:

providing a first surface for receiving a negative lenticular media pattern;

providing a second surface for imparting said negative lenticular media pattern in said first surface;

providing a third surface for receiving said negative lenticular media pattern from said first surface;

engageably contacting said second surface in predetermined regions of said first surface so as to form said main portion and encoded portion of said negative lenticular media pattern on said first surface, said second surface having geometry for imparting said negative lenticular media pattern in said first surface; and, impressing said negative lenticular media pattern of said first surface into contact with said third surface thereby forming a lenticular media pattern in said third surface, said third surface containing said lenticular media pattern further defining lenticular media.

23. The method recited in claim 22 further comprising the step of finishing said third surface so as to produce a predetermined sized lenticular media.

24. The method recited in claim 23 wherein said finishing step includes cutting said lenticular media at a predetermined distance from said encoded portion.

25. The method of claim 22 wherein said first surface is a chill roll surface.

26. The method of claim 22 wherein said first surface is a mold cavity surface.

* * * * *